United States Patent [19]

Yuan

[11] 4,138,995
[45] Feb. 13, 1979

[54] SOLAR ENERGY STORAGE AND UTILIZATION

[76] Inventor: Shao W. Yuan, 2021 Highboro Way, Falls Church, Va. 22043

[21] Appl. No.: 717,686

[22] Filed: Aug. 25, 1976

[51] Int. Cl.² .............................. F24J 3/02; F24H 7/00
[52] U.S. Cl. ..................................... 126/271; 126/400
[58] Field of Search ............... 126/271, 400; 237/1 A; 165/18, 48, 45; 62/119

[56] References Cited

U.S. PATENT DOCUMENTS

| | | | |
|---|---|---|---|
| 2,584,573 | 2/1952 | Gay | 126/271 |
| 2,942,411 | 6/1960 | Hutchings | 126/271 |
| 3,369,541 | 2/1968 | Thomason | 126/271 |
| 3,965,972 | 6/1976 | Petersen | 126/271 |
| 3,980,130 | 9/1976 | Thomason et al. | 126/271 |
| 3,983,929 | 10/1976 | Thomason et al. | 126/271 |
| 4,010,731 | 3/1977 | Harrison | 126/271 |
| 4,016,861 | 4/1977 | Taylor | 126/271 |
| 4,034,912 | 7/1977 | Hayes | 126/271 |
| 4,037,583 | 7/1977 | Bakun et al. | 126/271 |
| 4,042,012 | 8/1977 | Perry et al. | 126/400 |
| 4,063,546 | 12/1977 | Schmid et al. | 126/400 |

FOREIGN PATENT DOCUMENTS 248161  1/1948  Switzerland ........................... 126/400

*Primary Examiner*—Lloyd L. King

[57] ABSTRACT

A system for storing and utilizing solar energy which includes the use of solar energy collectors attached to heat pipes for changing solar flux into heat energy and transmitting the heat energy into the earth below the surface of the ground. An expanding array of pipes, formed of heat conductive material, distributes the heat throughout a large, unconstrained volume of underground earth. The system provides for long-duration earth storage of the heat energy which can later be used for both space and hot water heating in homes, multiple-unit housing, commercial buildings, public buildings, etc.

A uni-directional heat pipe, characterized by having irreversible vapor flow, includes a pump arrangement for transferring working fluid from the condenser section to the evaporator section of the heat pipe.

15 Claims, 2 Drawing Figures

SOLAR ENERGY STORAGE AND UTILIZATION

BACKGROUND OF THE INVENTION

Until the nineteen-seventies, solar heating received only scattered, spasmodic attention because it was not price competitive with the use of fossil fuels. Renewed interest in solar energy has developed during the past few years as a result of increasing costs of energy from fossil fuels, the problems of depletion of resources, and the degradation of the environment. Although solar energy may be considered as a new and unconventional resource, it has been used for many centuries for drying agricultural products, heating water, etc.

Prior art solar heating systems are generally accomplished by placing large collector plates on the roof and side structure of buildings. Liquids, such as water, are piped through the collector, heated to a higher temperature, and subsequently circulated through a building and used as a space and tap-water heating medium. Such a system may be useful during the sunlight hours but loses its effectiveness after sundown. In a more elaborate application of the same principle, it has been suggested to place large tanks of water, rocks, stones, etc., in the ground and have heated water from the solar collector fed into the tanks, where the heat energy is stored and utilized for space and hot water heating. But, during prolonged cloudy or rainy weather, such a system loses its effectiveness because of its incapacity to store more than a few days' supply of heat energy. Furthermore, during the winter period when the heat is most desirable, the efficiency of the solar radiation is much less than that of summer months, and heat loss from the collector to the surroundings is much greater. In short, currently known solar-heating systems must be installed in addition to, not instead of, conventional heating systems.

The earth, as a thermal storage reservoir, has several interesting attributes. First, heat capacities are extremely large because of the large available mass. For example, in a volume of one acre of land, 15 feet deep, at a temperature difference of 50° F. the energy flux is estimated to be $1.49 \times 10^9$ BTU. The area of one acre is much larger than an average house. Specifically, it is over 20 to 40 times larger than the average house of sizes from 2,000 ft$^2$ to 1,000 ft$^2$. Assuming a winter heating requirement of $60 \times 10^6$ BTU for a small house, such a volume of earth would be able to store sufficient heat to supply approximately 25 homes.

Another attribute of the earth is its extremely low thermal conductivity. Since the storage system may be unbounded in the downward and sideward directions as opposed to the confined, insulated and water-proofed constructions of the conventional designs, the low thermal conductivity of the earth restricts losses in those directions. It has been approximated that the total energy in the solar flux over one acre of area, for one summer season, is $1.2 \times 10^{10}$ BTU; these are approximately the heating requirements for 200 houses. It can therefore be seen that the theoretically available energy from the sun is extremely high.

SUMMARY OF THE INVENTION

The present invention relates to a system for collecting, storing and utilizing solar energy, and more particularly, relates to a system which utilizes the earth, or ground, as a long-duration storage for heat energy.

Part of the invention system also relates to a novel heat pipe characterized by having uni-directional irreversible vapor flow, and having a unique compact system for moving working fluid from the condenser section to the evaporator system.

The invention comtemplates a novel system for storing and utilizing solar energy wherein the system comprises a collector means for collecting solar energy and changing the solar energy to heat, means for transmitting the heat from the collector means to a location below the surface of the ground, and a distributing means disposed within the ground for distributing the heat from the mentioned location throughout a considerable volume of the ground for raising the temperature of the considerable volume of ground to thereby establish a heat reservoir.

For accomplishing for foregoing objective, the invention contemplates the use of solar collectors, a heat pipe or pipes for transmission of the solar heat energy to the storage ground, and piping loops for both transmission and storage of heat in the system, and extraction of heat from the storage ground for space heating and hot water heating. The heat pipe functions in the system as a sort of rectifier, for changing solar flux to heat energy, and allowing the heat energy to flow with the least possible resistance from the evaporator section of the heat pipe to a desired depth underground during the period of time when the sun is shining, but prevents the reverse flow of heat energy when the temperature above the ground is lower than that of the storage ground.

Accordingly, an important object of the invention is to provide for long-duration earth storage of solar energy which can be used for both space heating and hot water heating systems, year-round, in multiple-unit housing, public buildings such as schools, etc., commercial buildings or single dwellings.

Another object of the invention is to provide a highly efficient means for transferring solar energy from solar flux collectors into the ground for storage of heat through the use of novel heat pipe including an evaporator section, an adiabatic section, a condenser section and a working fluid, wick means disposed only in the evaporator section and condenser section, and pump means for transferring the working fluid, after phase change from vapor to liquid from the condenser section to the evaporator section.

Further, the invention provides such a heat pipe wherein the pump means includes a fluid line extending from the condenser section to the evaporator section and a pump is connected in the fluid line.

A further, and important, object of the invention is to provide such a heat pipe wherein the pump is disposed at a location remote from the condenser section.

A still further object of the invention is to provide a novel heat pipe wherein the evaporator section and the condenser section each include an outer casing formed of heat conductive material, and the adiabatic section has at least a portion thereof formed of a poor heat conductive material for precluding transfer of heat by conduction between the condenser section and the evaporator section.

A further object of the invention is to provide a large thermal storage reservoir in the unprepared earth and to utilize the stored energy for year-round space heating and hot water heating substantially or completely without the aid of conventional heating systems.

A still further object of the invention is to provide a solar heating system which need not be an integral part of the solar heated home, if so desired, thus having no adverse impact on the esthetics of the home.

A still further object is to provide an efficient means to collect and store an abundance of solar energy during the summer season for subsequent winter use when the efficiency of collecting solar energy is extremely low.

Further objects and advantages of my invention will become apparent from an understanding of the following detailed description of preferred embodiments of my invention.

DESCRIPTION OF THE PREFERRED EMBODIMENTS

Figure 1:
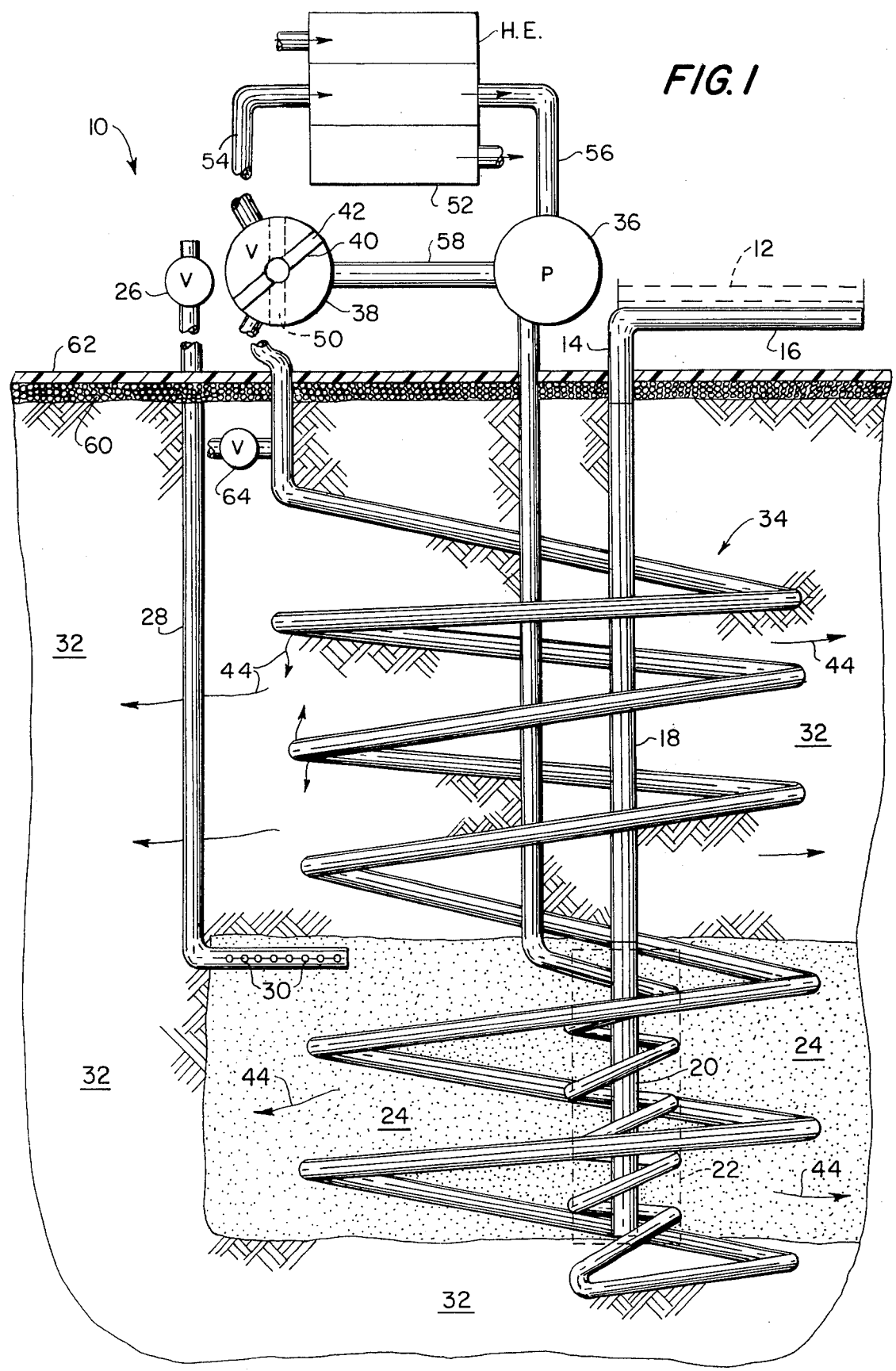
FIG. 1 is a diagrammatic sectional view of a system for collecting, storing and utilizing solar energy in accordance with the present invention.

Referring to FIG. 1, the novel collection, storage and utilization system, generally indicated by the numeral 10, includes a conventional solar collector 12 (shown in broken lines) which collector 12 may be planar, parabolic, or any other type of collector, for collecting solar energy and transferring the heat energy thereof to a heat pipe 14. The heat pipe includes an evaporator section 16, adiabatic section 18, and a condenser section 20. The particular details of construction for the heat pipe 14 will be later described in connection with the showing in FIG. 2. Briefly, however, energy is absorbed by the evaporator section 16 and transferred through the adiabatic section 18 down to the condenser section 20, which section 20 may be, depending upon circumstances, located at a depth below the earth's surface a distance of approximately 5 feet to 30 feet, or more.

At a location 22, represented by a volume of earth encompassed within the broken line rectangle, heat is absorbed from the condenser section 20, where the phase change from vapor to liquid is taken place. Heat energy is transmitted in all directions from this location 22, thereby cooling the condenser section 20 and causing the heat energy to be transferred to the surrounding earth. One important feature of the present invention is to surround the condenser section 20 with material which has a higher coefficient of heat conductivity than the normal soil. One such manner is illustrated by the provision of a relatively small volume of granular sand 24, and the like, which may have the moisture content thereof increased by piping water, or the like, through a control valve 26 downwardly through a supply pipe 28 and outwardly through a series of holes 30. It will be understood that the moist sand 24 will aid in transmitting heat outwardly from the location 22 to the surrounding unprepared earth soil, generally designated by the numeral 32. It is understood that other types of heat conductive material, such as metal and the like, which may also be in the form of fins extending outwardly from the condenser section 20 may be be used instead of, or in combination with, the moist sand 24.

In addition to the foregoing described manner of transmitting heat energy from the condenser section 20 to the surrounding soil 32, the present invention also includes the provision of an expanding array of pipe (or pipes), generally indicated by the numeral 34. The pipe 34 is comprised of a closed loop in which is located a pump 36 and a two-way valve 38 having a vane 40 shown by solid lines located in a first position 42. In order to transmit heat energy from the location 22 throughout the soil 32, the pipe 34 is completely filled with heat transfer fluid, such as water and the like, the heat transfer fluid being circulated within the pipe 34 downwardly from the pump 36 and spirally about the condenser section 20 throughout the location 22. During this time, the heat transfer fluid picks up heat and then carries it throughout the expanding array of pipe 34 to distribute the heat throughout a large volume of the earth's soil 32. This distibution of the heat is generally indicated by the plurality of the arrows 44. It will be appreciated that after the system has been operating for a period of time, the temperature of the sand 24, the soil 32, and beyond, will be elevated to a sufficiently high degree such that adequate heat supply may be later extracted for subsequent use.

When it is desired to use some of the heat that has been stored in the soil 32, the valve vane 40 is moved to the dotted line position 50. As one example of apparatus for using the storage heat, a heat exchanger 52 is connected across the valve 38 and the pump 36 by pipes 54 and 56 so that the heat transfer fluid does not pass directly from the valve 38 to the pump 36 through a connecting pipe 58. It is, of course, to be understood that the hot water in pipe 54 gives up its heat energy as it passes through the heat exchanger 52, becomes cooler, and passes downwardly through the pump 36 into the array of pipe 34 to become heated and again return to the heat exchanger 52.

In order to increase the efficiency of the heat storage system, a layer of insulating material 60 is disposed about on the surface of the earth, and preferably, the insulating material 60 is covered by a sheet, or sheets, of black plastic 62, or the like, to serve as a vapor barrier and also to aid in collecting additional heat from the solar flux and transmitting such heat into the soil 32 and in absorbing more heat because black materials characteristically have the highest heat absorbtivities.

While the foregoing description of the invention has been limited to only a single array of pipe 34, it will be readily understood that multiple arrays of pipe 34 and additional heat pipes 14 may be connected to the system through a valve 64.

Figure 2:
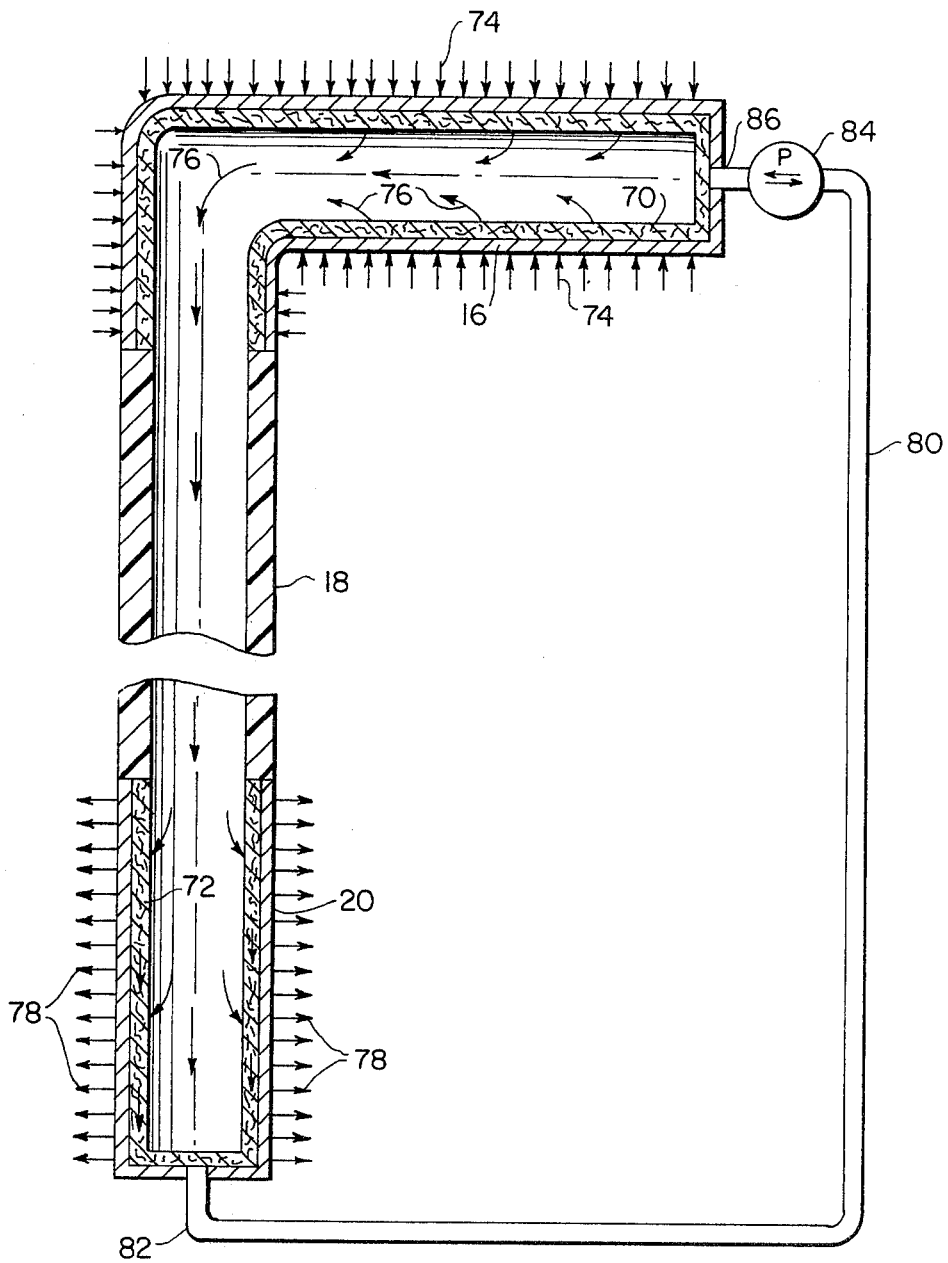
FIG. 2 is a diagrammatic vertical section of a heat pipe constructed in accordance with the present invention.

FIG. 2 illustrates the constructional details of a preferred heat pipe 14 which is utilized in the system 10 of FIG. 1. The heat pipe 14 includes an evaporator section 16, an adiabatic section 18, and a condenser section 20 as well as containing a working fluid (not illustrated). The evaporator section 16 is lined with a wick 70 and the condenser section 20 is lined with a wick 72. It is to be noted that the adiabatic section 18 is not lined with any similar wick. The wick 70 and 72 may be metal, such as wire screen, sintered metal powder or fiber, or perforated sheets, or it may be a non-metallic material such as felt, cloth, or fiber glass. The working fluid may be water, ammonia, acetone, fluorocarbons (refrigerants), alcohols, and various liquid metals. However, only enough working fluid to saturate the wick is introduced into the heat pipe. The choice of container, wick material, and working fluid combination is based on the operations and design criteria of the heat pipe application.

In evaporator section 16 heat energy, indicated by the arrows 74, is received from the solar collector 12 (FIG. 1) and is transferred by conduction through the outer wall of the evaporator section 16. The heat energy 74 causes the working fluid to vaporize, as indicated by the arrows 76. The vaporized working fluid then flows downwardly through the adiabatic section 18 to the condenser section 20 where the vapor condenses and the heat energy is transmitted outwardly to the wick 72 through the wall of the condenser section 20, all as is indicated by the arrows 78. It is to be understood this heat, as indicated by the arrows 78, is the heat given up in the location 22 of FIG. 1.

In order that heat pipe 14 operates in a continuous manner, it is necessary that the working fluid condensate in the condenser section 20 be returned to the evaporator section 16. This return of working fluid is provided by the provision of a return line 80 which is connected to a port 82, at the bottom of the condenser section 20, and connected to a pump 84 which is, in turn, connected to a port 86 at the evaporator 16. While the pump 84 is indicated as being a reversible pump, so that the heat pipe 14 is useful in other modes of operation, it is to be understood that when the heat pipe 14 is used in the environment of the system 10, of FIG. 1, the pump 84 is operated only in the direction to return working fluid from the condenser section 20 to the evaporator section 16. This is an important part of the system 10 so that, when the collector 12 is not operating and the ambient temperature around the evaporator 16 is lower than the ground temperature around the condenser section 20, the heat pipe 14 is irreversible; in other words, heat energy is not transmitted upwardly through the adiabatic section 18 and lost to the atmosphere through the evaporator section 16.

When the solar energy is not available, or during extremely cold weather, the pump 84 will be shut off automatically by a thermostatic control (not shown). This prevent the reverse vapor flow in order to avoid heat losses from the earth reservoir to the surrounding environment. As an additional measure to prevent heat loss by axial conduction of heat upwardly through the heat pipe 14, the adiabatic section 18 is made of a poor heat conductive material. Thus, the condenser section 20 is insulated from the evaporator section 16.

While a preferred system and a preferred heat pipe for use in such system has been illustrated and described, it is to be understood that various changes and arrangement of parts may be made without departing from the spirit and scope of the invention as defined in the appended claim subject matter.

I claim:

1. A system for storing and utilizing solar energy comprising:
   collector means for collecting solar energy and changing said solar energy to heat;
   transmitting means for transmitting said heat from said collector means to a location below the surface of the ground;
   distributing means comprising a closed loop piping system extending out from said location into the surrounding soil, and means for causing a heat transfer fluid to flow within said piping system, said distributing means positioned adjacent said transmitting means at said location and in efficient heat transfer relationship with said transmitting means, said distributing means extending through a volume of said ground for raising the temperature of said volume of ground thereby establishing a stored heat reservoir, said heat reservoir having a heat storage volume substantially greater than that formed by the transmitting means alone; and
   control means including valve means in said distributing means, and heat exchange means in fluid flow connection with said valve means for controlling flow of said heat transfer fluid in said distributing means and thus permitting said distributing means to function as means for extracting heat from the ground.

2. A system as defined in claim 1 wherein said transmitting means for transmitting said heat from said collector means comprises a heat pipe.

3. A system as defined in claim 2 wherein said heat pipe includes an evaporator section at said collector means and a condenser section at said location below the surface of the ground.

4. A system as defined in claim 1 including heat insulating means located adjacent the surface of the ground for minimizing the heat losses from said volume of ground into the atmosphere.

5. A system as defined in claim 1 including heat extraction means for extracting heat from said heat reservoir and delivering said heat to a desired location.

6. The system as defined in claim 1 wherein the lateral area which defines said volume is at least one acre.

7. The system as defined in claim 1 wherein said volume is at least 30 feet deep.

8. The system as defined in claim 1 wherein said piping system includes a spirally wound array of heat-conductive piping.

9. The system as defined in claim 8 wherein said array of heat conductive piping comprises a spirally wound array of heat conductive piping having the axis of the spiral generally extending in the direction of the local gravity gradient.

10. The system as defined in claim 9 wherein the axis of the spiral extends in a generally vertical direction.

11. The system as defined in claim 10 including liquid distribution means for introducing a liquid to said material to provide for a high level of thermal conductivity.

12. The system as defined in claim 1 wherein said heat transfer fluid consists essentially of water.

13. The system as defined in claim 1 in which said transmitting means at said location is surrounded by a zone of material having a thermal conductivity that is higher than the thermal conductivity of natural soil.

14. A system for storing and utilizing solar energy comprising:
   collector means for collecting solar energy and changing said solar energy to heat;
   transmitting means including a closed loop piping system for transmitting said heat from said collector means to a location below the surface of the ground;
   distributing means comprising a closed loop piping system extending out from said location into the surrounding soil, and means for causing a heat transfer fluid to flow within said piping system, said distributing means positioned adjacent said transmitting means at said location and in efficient heat transfer relationship with said transmitting means, said distributing means extending through a volume of said ground for raising the temperature of said volume of ground thereby establishing a stored heat reservoir, said heat reservoir having a heat storage volume substantially greater than that formed by the transmitting means alone;

means for increasing the rate of heat transfer from said transmitting means to said distributing means above the rate of heat transfer of normal soil at said location; and control means including valve means in said distributing means, and heat exchange means in fluid flow connection with said valve means for controlling flow of said heat transfer fluid in said distributing means and thus permitting said distributing means to function as means for extracting heat from the ground.

15. The system as defined in claim 14 in which said means for increasing the rate of heat transfer includes a volume of granular sand surrounding said location and a water supply means including a control valve for increasing the moisture content of said volume of granular sand.

* * * * *